No. 629,467. Patented July 25, 1899.
D. QUINTAL.
CARRIAGE WHEEL HUB.
(Application filed July 23, 1898.)
(No Model.) 2 Sheets—Sheet 1.
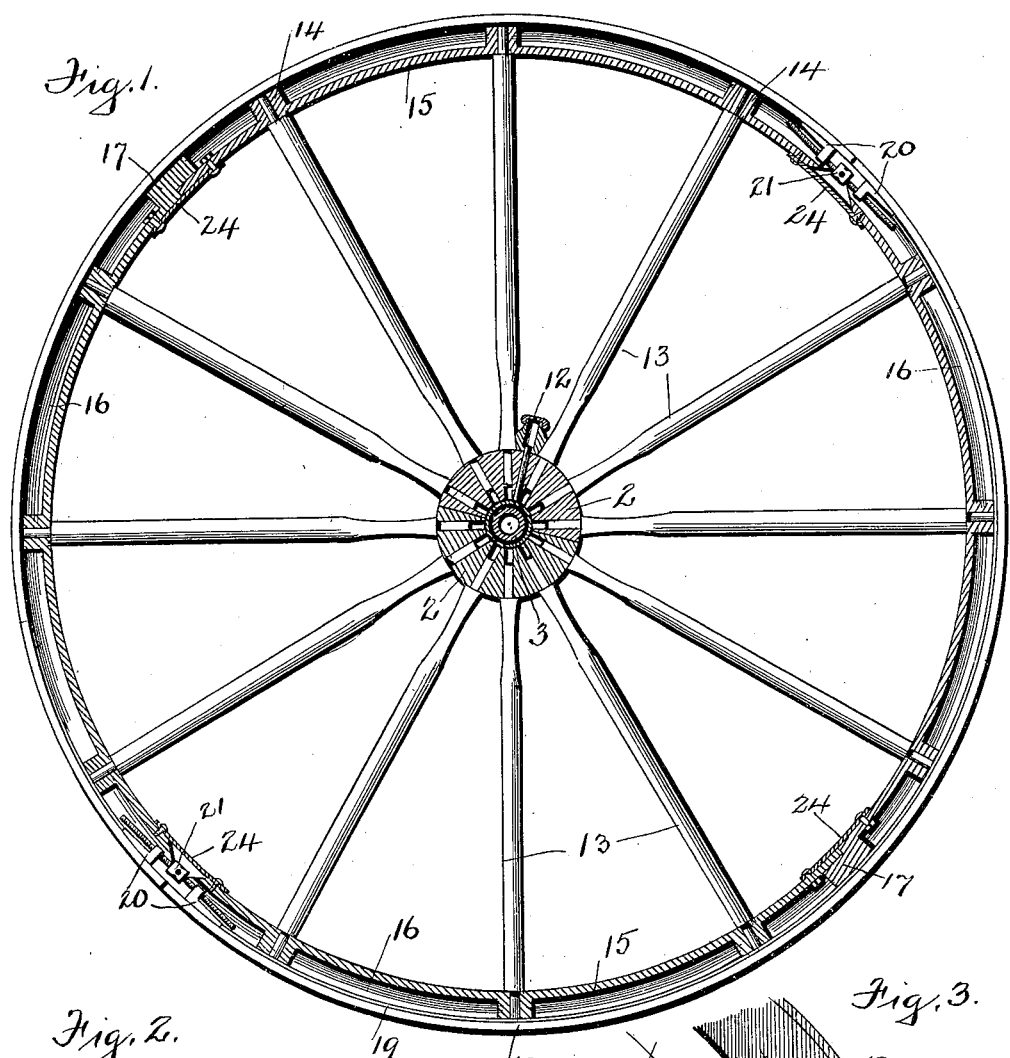
Fig. 1.
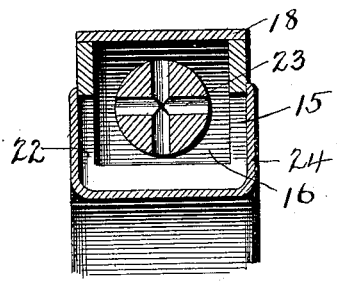
Fig. 2.
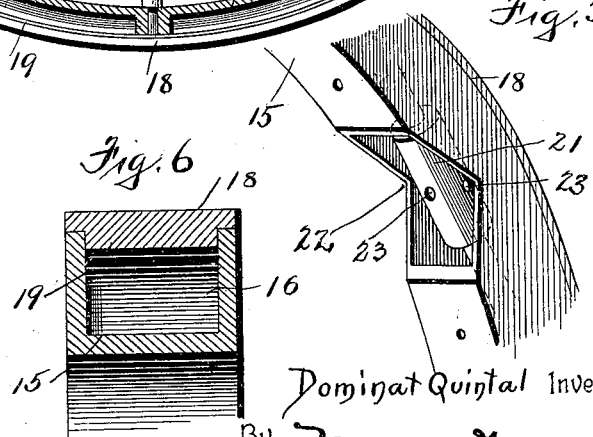
Fig. 6.
Fig. 3.
Witnesses:
T. L. Mockabee
Horace T. Deitz
Dominat Quintal Inventor
By Marion & Marion
his Attorneys
THE NORRIS PETERS CO., PHOTO-LITHO., WASHINGTON, D. C.

No. 629,467. Patented July 25, 1899.
D. QUINTAL.
CARRIAGE WHEEL HUB.
(Application filed July 23, 1898.)
(No Model.) 2 Sheets—Sheet 2.

Witnesses: Dominat Quintal, Inventor
By Marion Marion
his Attorneys

UNITED STATES PATENT OFFICE.

DOMINAT QUINTAL, OF ISLE DUPAS, CANADA.

CARRIAGE-WHEEL HUB.

SPECIFICATION forming part of Letters Patent No. 629,467, dated July 25, 1899.

Application filed July 23, 1898. Serial No. 686,682. (No model.)

*To all whom it may concern:*

Be it known that I, DOMINAT QUINTAL, a subject of Her Majesty the Queen of Great Britain, residing at Isle Dupas, county of Berthier, Province of Quebec, Canada, have invented certain new and useful Improvements in Carriage-Wheels, (for which Letters Patent of the Dominion of Canada were granted January 5, 1899, No. 62,223, the application for which was duly filed July 22, 1898, Serial No. 82,503;) and I do hereby declare the following to be a full, clear, and exact description of the invention, such as will enable others skilled in the art to which it appertains to make and use the same.

My invention relates to improvements in carriage-wheels, and has particular relation to the formation of the hub.

The object of my invention is to provide a hub which can be readily adjusted into position, which can be taken apart for the purpose of repairs, and which can be made at an extremely low cost.

A further object is to provide a device of this character which will be neat and attractive in appearance, durable in construction, simple in operation, and which can be made for a moderate cost.

To these ends my invention consists in the improved construction and combination of parts hereinafter fully described, and particularly pointed out in the appended claims.

Figure 4:
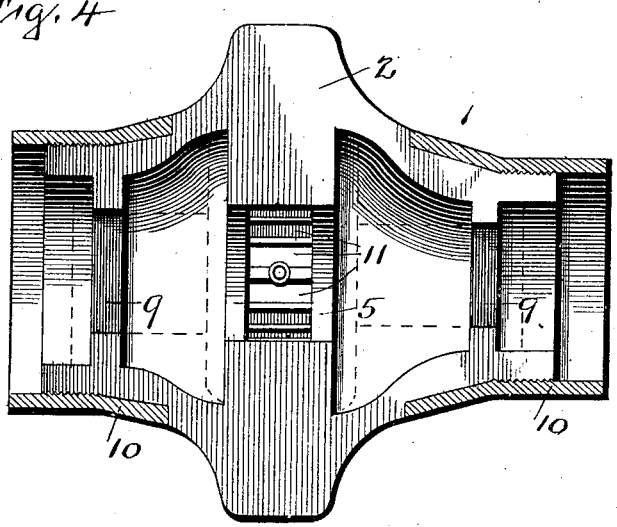
Figure 5:
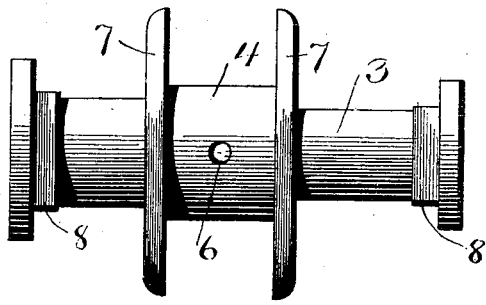

In the drawings, in which similar numerals of reference indicate similar parts in all of the views, Figure 1 is a vertical sectional view of a wheel, showing my improvement in position. Fig. 2 is a transverse sectional view taken through the rim-tightening means. Fig. 3 is a detail perspective view of the same. Fig. 4 is a view of the outer section of the hub, the inner section being removed. Fig. 5 is a detail of the inner section. Fig. 6 is a transverse section through the tire and felly.

In the providing of wheels of the class mentioned with tires the practice generally in use at the present time consists in first completing the wheel, including the felly, and then shrinking the tire onto the wheel. While this forms an efficient means of securing the tire, yet it involves a great deal of trouble in first placing the tire into position and afterward, when the wheel becomes loose by continual wear and the tire does not fit tightly into place, it must be removed and refitted, which takes an additional amount of time and expense. To obviate this, I have provided the construction hereinafter described, in which the tire can at all times be tightened without necessitating its removal from the felly.

In addition to the above disadvantages hubs as formed at the present time are extremely difficult to manufacture and to repair in case of accidents, and in addition to this they must, in order that they may have sufficient rigidity, &c., be made in cumbersome form. To obviate this, I have provided a sectional hub which can be easily taken apart to be cleaned, the fact being that when used in connection with the tire formed as herein described the wheel can be readily taken apart by any one and placed in position without difficulty and allowing of a ready renewal of the parts when necessary.

1 designates a hub constructed in accordance with my invention and formed of the outer members 2 and inner member 3. The inner member is adapted to be placed on the carriage-axle, the member being provided with a suitable opening for the spindle of the axle, and is adapted to fit within the two outer members 2. The inner member 3 is provided with a central cylindrical portion 4, which rests within an opening 5, formed within the members 2, said portion 4 being provided with an opening 6, leading to the interior of the member 3, in order to allow of the passage of the oil to the spindle. Flanges 7, formed on each side of the portion 4, serve to retain the portion 3 in position within the members 2, and to prevent a rotatory movement of the member 3 within the members 2. I provide suitable squared portions 8 on the member 3, which portions are adapted to rest within squared openings 9, formed within the members 2.

The members 2 are held together with the member 3 in position by means of suitable collars 10, secured on the outer portion of the members 2, as best shown in Fig. 4, and each member 2 is provided with suitable spoke-sockets 11, which are adapted to receive the spokes. One of the members 2 is provided with a suitable oil-cup 12, which communicates with the opening 6, by means of which oil is at all times passed onto the spindle and the wheel kept in an easy-running condition.

The spokes 13 may be formed in any preferred manner, they not forming a particular portion of my device, said spokes having their outer ends passed into openings 14, formed in the felly 15. The felly is preferably formed in two sections and is provided with a peripheral groove 16, as best shown in Fig. 1, said groove being deepened between the portions containing the openings 14. The two portions of the felly are secured together by any suitable means, such as is shown at 17 in Fig. 1; but it will be readily seen that this construction of felly forms an extremely-light wheel, yet very durable.

The tire 18 is preferably formed in two sections and is provided with an interior annular flange 19, which is adapted to be passed into the peripheral groove 16. Each section of the tire, near its ends, is provided with a screw-threaded nut 20, within which is mounted a right and left hand screw-threaded connecting-bolt 21, the bolt being adapted to be passed into the contiguous nuts 20, as best shown in Fig. 1. It will be apparent that when the tire is placed in position on the felly a tightening of the bolts 21 will cause the sections of the tire to be drawn together and tightly around the felly, and in order that said bolts may be readily operated upon I provide a suitable recess-opening 22 in the felly and also suitable radial openings 23 in the bolt 21. By this construction I am enabled to have access to and readily rotate the bolt by means of any suitable instrument, such as a nail, file, &c. The opening 22 may be closed by any suitable plate, such as shown at 24 in Fig. 1, and a similar plate may be used to close the joined edges of the felly. It will be apparent from this construction that the wheel can be easily and readily taken apart by simply releasing the plates 24, unscrewing the bolts 21 a sufficient distance to allow the tire to be taken off, and removing the collars 10, when the wheel can be taken apart for the purpose of cleaning the parts or giving them a thorough overhauling. The advantages of this construction are many and obvious.

Having thus described my invention, what I claim as new is—

1. A hub for vehicles, comprising an outer portion; an inner portion removably located therein, said inner portion being held against rotatory movement within said outer portion.

2. A hub for vehicles, comprising an inner member, having a squared portion; an outer portion located about said inner member, said outer portion having openings to receive said squared portions.

3. A hub for vehicles, comprising an inner member, said inner member being provided with squared portions; sectional outer members located without said inner member, each of said sectional members being provided with openings to receive said squared portions; and means for removably securing said outer members in position without said inner member.

In witness whereof I have hereunto set my hand in the presence of two witnesses.

DOMINAT QUINTAL.

Witnesses:
J. A. MARION,
HORACE G. SEITZ.